Figure 1:
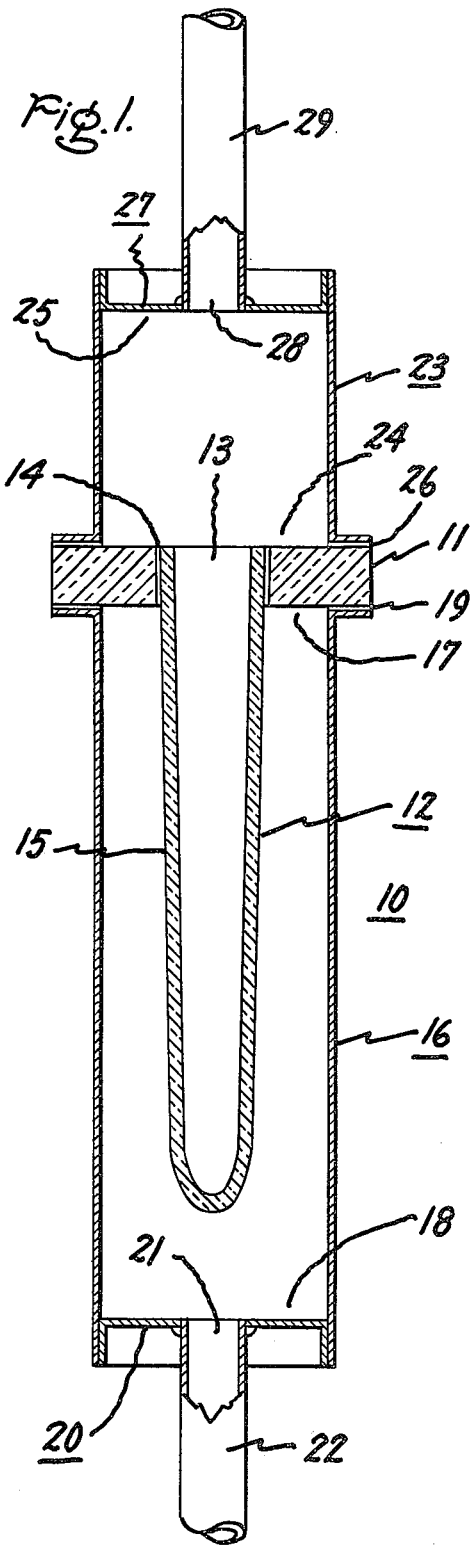

United States Patent [19]
Mitoff et al.

[11] 3,960,596
[45] June 1, 1976

[54] BATTERY CASING AND HERMETICALLY SEALED SODIUM-SULFUR BATTERY

[75] Inventors: Stephan P. Mitoff, Elnora; Robert W. Powers; Manfred W. Breiter, both of Schenectady, all of N.Y.

[73] Assignee: General Electric Company, Schenectady, N.Y.

[22] Filed: Mar. 4, 1974

[21] Appl. No.: 447,850

[52] U.S. Cl. ............................... 136/6 FS; 136/20; 136/100 R; 136/166
[51] Int. Cl.² ........................................ H01M 1/02
[58] Field of Search .................. 136/6 FS, 6 F, 6 R, 136/20, 83 R, 100 R, 166, 169, 170; 206/2; 220/67–68

[56] References Cited
UNITED STATES PATENTS

| | | | |
|---|---|---|---|
| 3,660,063 | 5/1972 | Christopher | 136/20 X |
| 3,756,856 | 9/1973 | Tennenhouse | 136/6 FS |
| 3,770,502 | 11/1973 | Nakabayashi | 136/6 FS |
| 3,811,943 | 5/1974 | Minck et al. | 136/6 FS |
| 3,826,685 | 7/1974 | Dubin et al. | 136/83 R |
| 3,868,273 | 2/1975 | Will et al. | 136/83 R |

*Primary Examiner*—Anthony Skapars
*Attorney, Agent, or Firm*—Paul R. Webb, II; Joseph T. Cohen; Jerome C. Squillaro

[57] ABSTRACT

A battery casing and a sealed sodium-sulfur battery are disclosed wherein the battery casing includes separate seals of low temperature melting glass joining a portion of an inner casing of a solid sodium ion-conductive material to the interior surface of a ceramic ring, and joining two opposed outer metallic casings to the ceramic ring. A sealed sodium-sulfur battery has the above type of casing with a sodium anode in one casing and a cathode of sulfur in conductive material in the other casing.

5 Claims, 2 Drawing Figures

U.S. Patent June 1, 1976 3,960,596

BATTERY CASING AND HERMETICALLY SEALED SODIUM-SULFUR BATTERY

This invention relates to improved battery casings and to hermetically sealed batteries and, more particularly, to such battery casings and to hermetically sealed sodium-sulfur batteries.

Sodium-sulfur cells, which operate at elevated temperatures, are known in the prior art as, for example, described in Kummer et al. U.S. Pat. No. 3,404,036 issued Oct. 1, 1968 under the title "Energy Conversion Device Comprising a Solid Crystalline Electrolyte and a Solid Reaction Zone Separator". The solid crystalline ion-conductive electrolyte in the above-mentioned sodium-sulfur battery can be sodium beta-alumina. Sodium-sulfur batteries are shown also, for example, in Kummer et al. U.S. Pat. No. 3,404,035 and in Kummer et al. U.S. Pat. 3,413,150.

Our present invention is directed to providing an improved battery casing and an improved hermetically sealed sodium-sulfur battery over the above-identified patents in that separate glass seals join a portion of an inner casing of a solid sodium ion-conductive material to the interior surface of a ceramic ring, and join two opposed outer metallic casings to the ceramic ring.

The primary objects of our invention are to provide an improved battery casing and an improved hermetically sealed sodium-sulfur battery which exhibits constant current density during discharge.

In accordance with one aspect of our invention, a battery casing includes separate glass seals which join a portion of inner casing of a sodium ion-conductive material to the interior surface of a ceramic ring, and join two opposed outer metallic casings to the ceramic ring.

Figure 2:
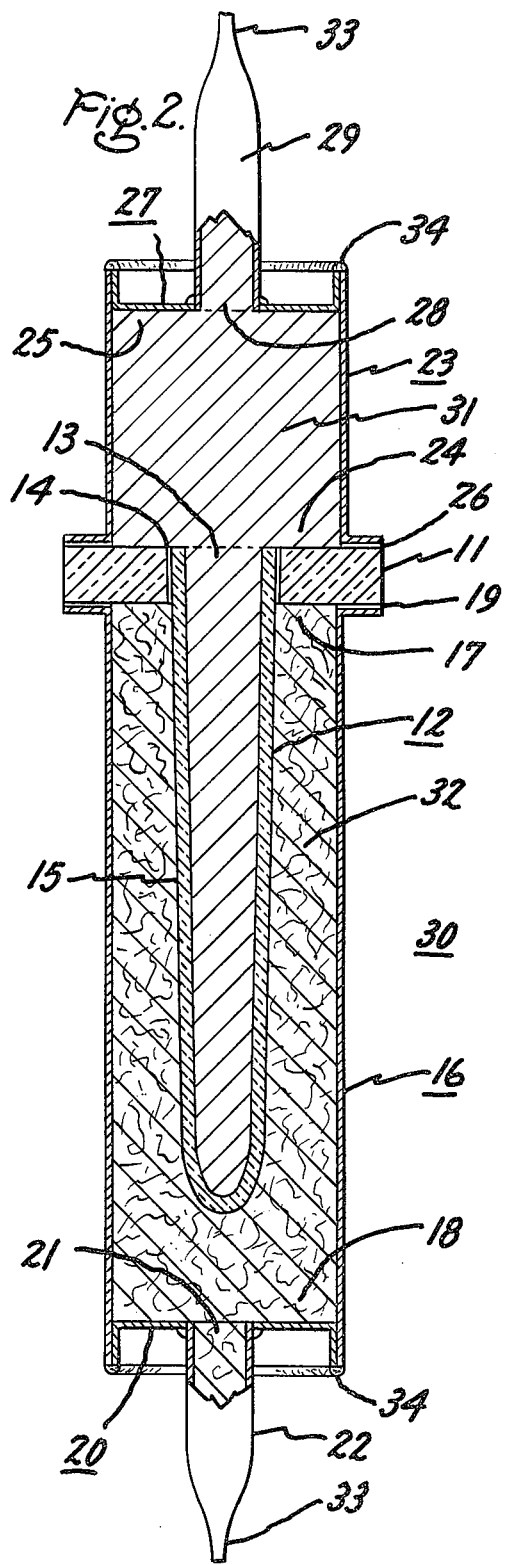

These and various other objects, features and advantages of the invention will be better understood from the following description taken in connection with the accompanying drawing in which:

FIG. 1 is a sectional view of a battery casing made in accordance with our invention; and FIG. 2 is a sectional view of a battery made in accordance with our invention.

In FIG. 1 of the drawing, there is shown generally at 10 a battery casing embodying our invention which has a ceramic ring 11, an inner casing of a solid sodium ion-conductive material 12 with one open end 13, and a glass seal 14 sealing a portion of the outer wall 15 of inner casing 12 adjacent its open end 13 within and to the ceramic ring 11. A first outer metallic casing 16 with opposite open ends 17 and 18 has a glass seal 19 sealing one end 17 of first outer metallic casing 16 to ceramic ring 11. First outer casing 16 surrounds inner casing 11 and is spaced therefrom. A removable closed end 20 for opposite open end 18 of first outer casing 16 has a fill opening 21 in removable closed end 20, and a fill tube 22 affixed to removable closed end 20 and in communication with the fill opening 21.

A second outer metallic casing 23 with opposite open ends 24 and 25 has a glass seal 26 sealing one end 24 of second outer metallic casing 23 to ceramic ring 11. Second outer metallic casing 23 extends in an opposite direction to first outer metallic casing 16. A second removable closed end 27 for opposite open end 25 of second outer casing 23 has a fill opening 28 in second removable closed end 27, and a fill tube 29 affixed to second removable closed end 27 and in communication with fill opening 23. The resulting device is a battery casing made in accordance with our invention.

We found that we could form a battery casing by providing a ceramic ring, for example, of alpha-alumina. An inner casing of a solid sodium ion-conductive material of sodium beta-alumina with one open end has a portion of its outer wall adjacent its open end sealed within and to the ceramic ring with a glass seal. A first outer metallic casing with opposite open ends is sealed to the ceramic ring by a glass seal. In this manner, the first outer casing surrounds the inner casing and is spaced therefrom. A removable metallic closed end is provided for the opposite open end of the first outer casing. This closed end has a fill opening therein and a fill tube affixed thereto and is in communication with the fill opening. A second outer metallic casing with opposite open ends is sealed to the ceramic ring by a glass seal. In this manner, the second outer metallic casing is spaced from and extends in an opposite direction to the first outer metallic casing. A second metallic removable closed end is provided for the opposite open end of the second outer casing. This closed end has a fill opening therein and a fill tube affixed thereto and is in communication with the fill opening.

We found that the preferred metal for the outer casings and removable closed ends was a Rodar alloy which is an alloy of iron-nickel-cobalt. Such an alloy consists of 53 weight percent iron, 29 weight percent nickel, 17 weight percent cobalt, and 1 weight percent of impurities. Additionally, the casing, when used to contain a sulfur compound in a battery structure, can be formed of tantalum or stainless steel. The casing, when used to contain sodium in a battery structure, can be formed of an alloy of 20 weight percent nickel, 17 weight percent cobalt, 0.2 weight percent manganese, and the balance iron.

For each of the above seals, glass is provided in the form of a washer. Each washer is positioned between adjacent associated parts to be sealed. The glass washers are made of a suitable sodium and sulfur resistant glass such as Corning glass No. 7052, General Electric Company glass No. 1013, Sovirel glass No. 747 or Kimble glass No. N-51A. The associated components with the glass washer therebetween are heated to a temperature in the range of 950° to 1250°C in an argon atmosphere whereby the glass seals together the associated component. The upper portion of the outer wall of the inner casing is sealed in this manner within and to the interior surface of the ceramic ring. Each outer casing is sealed separately to the ceramic ring in the same manner. The end of each outer casing can be provided with an outwardly or inwardly extending flange for such sealing to the ceramic ring. Further, the end of each outer casing can be sealed to the perimeter of the ceramic ring.

In FIG. 2 of the drawing, there is shown a hermetically sealed sodium-sulfur battery 30 employing battery casing 10 of FIG. 1. An anode 31 is positioned preferably within inner casing 12. Anode 31 is sodium metal. A cathode 32 of sulfur and sodium polysulfide in a conductive material is positioned preferably within outer casing 16 and is in contact with outer wall 15 of inner vessel 12 and with the interior surface of outer casing 16. Fill tubes 22 and 29 are shown closed in any suitable manner such as by respective welds 33. Closed ends 20 and 27 are affixed to outer casings 16 and 13, respectively, as by welding 34. The resulting structure is a hermetically sealed sodium-sulfur cell.

We found that we could form a hermetically sealed sodium-sulfur battery by employing the above-described battery casing. The anode, which consists of sodium metal is positioned preferably within the inner casing and its associated outer casing. The cathode is positioned preferably within the outer metallic casing surrounding the inner casing and is in contact with the exterior surface of the inner casing and with the interior of the outer casing. The inner casing and associated outer casing are filled with sodium metal by filling the inner casing through the fill tube and fill opening with molten sodium. The fill tube is then closed, for example, by crimping or by welding. In this manner there is a hermetically sealed anode reactant compartment for the cell. The cathode, which consists of sulfur and sodium polysulfide in a conductive material, is then positioned within the other outer casing of the cell. This is accomplished, for example, by positioning a conductive material such as carbon felt within this outer casing. This outer casing is filled with carbon felt so that it contacts the exterior surface of the inner vessel and extends to the initially open end of the outer casing. The closed end is then welded to the outer casing. Molten sulfur and sodium polysulfide are then filled into this outer casing through the associated fill tube and fill opening, and allowed to solidify within the carbon felt thereby providing the cathode. The fill tube is then closed, for example, by crimping or by welding. The filling tubes enable the evacuation of the battery compartments at temperatures up to 600°C with subsequent introductions of sodium and sulfur compound into the evacuated compartments without contact with the atmosphere. This results in a hermetically sealed cathode compartment for the cell. The resulting structure is a hermetically sealed sodium-sulfur cell. While we prefer to fill the inner casings with sodium and position the cathode within the outer casing, the anode and cathode are interchangeable providing the conductive material is included in the cathode compartment.

For operation of this battery, an appropriate heating device (not shown) surrounds the cell to provide a necessary operating temperature of between 285°C and 400° C. Such a heating device can take various conventional forms such as a heating coil or a furnace. In the operation of the present sodium-sulfur battery within its elevated operating temperature during its discharge half cycle sodium ions are passed into the sulfur reactant within the cathode compartment of the cell on the opposite side of the solid sodium ion-conductive material tube. When the sodium atoms are ionized, they release electrons which are carried from the anode compartment by an electric lead (not shown) to the cathode. In this manner electric energy is generated. While a single battery casing and a single hermetically sealed sodium-sulfur cell are described above, it will, of course, be appreciated that a plurality of these single batteries or cells can be used to provide a useful multi-cell battery.

Examples of battery casings and of hermetically sealed sodium-sulfur batteries made in accordance with our invention are set forth below.

EXAMPLE I

A battery casing was assembled as above-described and as shown in FIG. 1 by providing an alpha-alumina ceramic ring, an inner casing of a solid sodium ion-conductive material of sodium beta-alumina with one open end, has a portion of its outer wall adjacent its open end, sealed within and to the ceramic ring with No. 1013 glass. This seal was separately made in air at 1250°C. A first outer metallic casing of Rodar alloy with opposite open ends is sealed to the ceramic ring by No. 7052 glass. In the manner, the first outer casing surrounded the inner casing and was spaced therefrom. A removable Rodar alloy closed end was provided for the opposite open end of the first outer casing. This closed end had a fill opening therein and a fill tube affixed thereto and was in communication with the fill opening. A second outer Rodar alloy casing with opposite open ends was sealed at one end to the ceramic ring by No. 7052 glass. In this manner, the second outer metallic casing is spaced from and extended in an opposite direction to the first outer metallic casing. A second Rodar alloy removable closed end was provided for the opposite open end of the second outer casing. This closed end had therein a fill tube affixed thereto and was in communication with the fill opening. For each of the above seals, the glass was provided in the form of a washer which was held between associated parts. Each assembly was heated to a temperature of 950°C in an argon atmosphere thereby sealing together the associated parts. The structure resulted in a battery casing made in accordance with our invention.

EXAMPLE II

A hermetically sealed sodium-sulfur battery was assembled as above-described and as shown in FIG. 2. The battery casing was assembled as described above in Example I except that the removable closed end for the sulfur compound compartment was not positioned at the end of the casing as shown in FIG. 1. Prior to inserting the removable closed end, a conductive material such as carbon felt was inserted within the outer casing and surrounded the inner casing. The removable closed end was then positioned in the open end of the outer casing. The removable closed end was then welded to the end of the casing. The other removable closed end was then placed in the open end of the opposite casing and welded to the end of the casing. A molten sulfur compound of sulfur and sodium polysulfide was then added through the fill tube into contact with the carbon felt. The fill tube was then closed by crimping. Molten sodium was then added to the other fill tube after which the fill tube was closed by crimping. The resulting device was a hermetically sealed sodium-sulfur battery.

EXAMPLE III

At operating temperature, the hermetically sealed sodium-sulfur battery of Example II exhibited the following polarization behavior which is shown below in Table I.

TABLE I

| Current Density ma/cm$^2$ | Cell Voltage Volts |
| --- | --- |
| 1.0 | 2.068 |
| 3.0 | 2.055 |
| 10.0 | 2.020 |
| 30.0 | 1.45 |
| 100.0 | 1.735 |

While other modifications of the invention and variations thereof which may be employed within the scope of the invention have not been described, the invention is intended to include such as may be embraced within the following claims:

What we claim as new and desire to secure by Letters Patent of the United States is:

1. A battery casing comprising a ceramic ring, an inner casing of a solid sodium ion-conductive material with one open end, a glass seal sealing a portion of the outer wall of the inner casing adjacent its open end within and to the ceramic ring, a first outer metallic casing with opposite open ends and a flange at one open end, the first outer metallic casing surrounding the inner casing and spaced therefrom, the flange of the first outer metallic casing adjacent the ceramic ring, a glass seal sealing the flange of the first outer metallic casing to one surface of the ceramic ring, the first outer metallic casing and the inner casing defining a completely open chamber between the exterior surface of the inner casing and the interior surface of the outer casing, a removable metallic closed end for the opposite open end of the first outer casing, a second outer metallic casing with opposite open ends and a flange at one open end positioned with the flange adjacent the ceramic ring whereby the second outer metallic casing is spaced from and extends in an opposite direction to the first outer metallic casing portion, a glass seal sealing the flange of the second outer metallic casing to the opposite surface of the ceramic ring, and a second removable metallic closed end for the opposite open end of the second outer metallic casing.

2. A battery casing as in claim 1, in which each closed end has a fill opening therein, and a fill tube affixed to the closed end and in communication with the fill opening.

3. A hermetically sealed sodium-sulfur battery comprising a ceramic ring, an inner casing of a solid sodium ion-conductive material with one open end, a glass seal sealing a portion of the outer wall of the inner casing adjacent its open end within and to the ceramic ring, a first outer metallic casing with an open and a closed end and a flange at the open end, the first outer metallic casing surrounding the inner casing and spaced therefrom, the flange of the first outer metallic casing adjacent the ceramic ring, a glass seal sealing the flange of the first outer metallic casing to one surface of the ceramic ring, the first outer metallic casing and the inner casing defining a completely open chamber between the exterior surface of the inner casing and the interior surface of the outer casing, a second outer metallic casing with an open and a closed end and a flange at the open end positioned with the flange adjacent the ceramic ring whereby the second outer metallic casing is spaced from and extends in an opposite direction to the first outer metallic casing portion, a glass seal sealing the flange of the second outer metallic casing to the opposite surface of the ceramic ring, a sodium anode in the inner casing, and a cathode consisting of sulfur and sodium polysulfide in a conductive material, the cathode positioned within the first outer casing in contact with the outer wall of the inner casing and in contact with the interior surface of the first outer casing.

4. A hermetically sealed sodium-sulfur battery as in claim 3, in which the cathode is in the inner casing, and the anode is in the outer casing surrounding the inner casing.

5. A hermetically sealed sodium-sulfur battery as in claim 3, in which each closed end has a fill opening therein, and a sealed fill tube affixed to the closed end and in communication with the fill opening.

* * * * *